(12) United States Patent
Ansley et al.

(10) Patent No.: US 9,386,474 B2
(45) Date of Patent: Jul. 5, 2016

(54) QUALIFICATION OF WIRELESS NETWORK ENVIRONMENTS

(71) Applicant: ARRIS Solutions, Inc., Suwanee, GA (US)

(72) Inventors: Carol J. Ansley, Johns Creek, GA (US); Harindranath P. Nair, Portland, OR (US); Vishal Dhruv, Waban, MA (US); Elaine May, Portland, OR (US)

(73) Assignee: ARRIS Enterprises, Inc., Suwanee, GA (US)

( * ) Notice: Subject to any disclaimer, the term of this patent is extended or adjusted under 35 U.S.C. 154(b) by 3 days.

(21) Appl. No.: 14/201,305

(22) Filed: Mar. 7, 2014

(65) Prior Publication Data

US 2014/0254390 A1 Sep. 11, 2014

Related U.S. Application Data

(60) Provisional application No. 61/774,397, filed on Mar. 7, 2013.

(51) Int. Cl.
*H04W 4/00* (2009.01)
*H04W 24/10* (2009.01)
*H04W 24/06* (2009.01)

(52) U.S. Cl.
CPC .............. *H04W 24/10* (2013.01); *H04W 24/06* (2013.01)

(58) Field of Classification Search
None
See application file for complete search history.

(56) References Cited

U.S. PATENT DOCUMENTS

| | | | | |
|---|---|---|---|---|
| 2006/0274743 | A1* | 12/2006 | Yegin et al. | 370/389 |
| 2007/0038743 | A1* | 2/2007 | Hellhake et al. | 709/224 |
| 2008/0186882 | A1* | 8/2008 | Scherzer | H04W 88/02 370/310 |
| 2010/0211777 | A1* | 8/2010 | Ishihara et al. | 713/166 |
| 2010/0246416 | A1* | 9/2010 | Sinha et al. | 370/250 |
| 2011/0040870 | A1* | 2/2011 | Wynn et al. | 709/224 |
| 2011/0228829 | A1* | 9/2011 | Kazarnovski et al. | 375/220 |
| 2012/0223132 | A1* | 9/2012 | Lim | 235/375 |
| 2014/0033288 | A1* | 1/2014 | Wynn et al. | 726/7 |
| 2014/0315536 | A1* | 10/2014 | Chow et al. | 455/419 |

* cited by examiner

*Primary Examiner* — Anh-Vu Ly
(74) *Attorney, Agent, or Firm* — Stewart M. Wiener

(57) ABSTRACT

Systems, methods, and devices for qualifying quality of service in data services delivered through wireless networks established by wireless access points (WAPs) are disclosed. A portable computing device can be used to execute a wireless network connectivity qualification application that can include functionality for testing and evaluating wireless network connectivity signals between various devices, including the WAP, in a particular local wireless network. Based on the test results, the application can generate recommendations for remedying any detected network issues. The recommendations can be determined from information stored locally on the portable computing device or in remote backend servers.

17 Claims, 13 Drawing Sheets

QUALIFICATION OF WIRELESS NETWORK ENVIRONMENTS

CROSS-REFERENCES TO RELATED APPLICATIONS

The present disclosure claims priority to U.S. Provisional App. No. 61/774,397 entitled "A Method for Qualifying a Residence for WiFi Service", filed on Mar. 7, 2013, the contents of which is incorporated herein by reference in its entirety for all purposes.

BACKGROUND

The demand for wireless networking capability continues to increase with the proliferation of wireless network enabled consumer electronics. Even stationary devices that traditionally used to be tethered to wired network connections, such as printers, backup hard drives, and the like, now often include wireless network interface devices to allow for fast and flexible wireless installation in all types of wireless networking environments. In addition, the inclusion of wireless network interface devices in mobile computing devices, such smartphones, laptops, and tablets, allow for increased freedom and productivity. Mobile device users have come to expect to be able to quickly and easily access personal and public information wherever a wireless network connection is available.

To help their customers take advantage of the widespread deployment of wireless network capable devices, some high speed data service providers, such as cable internet service providers, now offer data access devices (e.g., cable modems) with integrated wireless network capabilities. For example, when a consumer orders a new High Speed Data (HSD) service, the service provider will deploy a data access device, such as a gateway (GW), a media gateway (MG), a cable modem (CM) or the like, with built-in wireless network capability. Such wireless network enabled devices, with and without high speed data access capabilities, are commonly referred to as wireless access points (WAPs).

To ensure quality of service to the consumer, a service provider must be prepared to support the use of WAPs. Quite often, newly deployed WAPs are installed in complicated wireless environments with congested frequency bands, physical barriers, and high expectations for the WAP to reliably provide service to many different types of devices. This presents challenges to the service provider at installation time and on an on-going basis throughout the of service life of the WAP to deliver consistently high quality of service.

At installation time, the service provider and the consumer would like to have some degree of confidence that the wireless network performance is acceptable before the installer moves to the next install. In the case of consumer self-installation, consumers and service providers alike would like to have a degree of confidence that the installation was completed at least correctly, if not optimally.

After installation, the wireless network environment supported by the WAP can change day-to-day and even hour-to-hour as wireless network devices (e.g., smartphones, tablet computer, laptop computer, etc.) enter and leave the physical location in which the WAP is located. While other devices, such as printers or set top boxes (STBs), may not physically move very often, the radio frequency (RF) environments in which the WAP is installed can change due to external influences. For example, electric motors, microwave ovens, and other electronic devices can cause significant interference on one more wireless network frequency bands. Also, the rearrangement of a physical object, such as furniture or equipment, relative to the WAP can also influence the wireless network environment. As such, there are numerous unpredictable factors that can cause the performance of a wireless network established by a particular WAP to vary.

SUMMARY

One embodiment of the present disclosure includes a method implemented in a portable computing device. The method comprises receiving a wireless access point identifier (WAPID) associated with a wireless access point (WAP), determining, one or more wireless network configurations associated with the WAP in response to the receiving of the WAPID, performing a wireless connectivity test with the WAP using at least one of the one or more wireless network configurations to test wireless connectivity with the WAP configured using the at least one of the one or more wireless network configurations, and generating a wireless connectivity test result based on the performing of the wireless connectivity test.

Another embodiment of the present disclosure includes a non-transitory computer-readable storage medium containing instructions that, when executed, control a computer system to be configured for: receiving a wireless access point identifier (WAPID) associated with a wireless access point (WAP), determining one or more wireless network configurations associated with the WAP in response to the WAPID, and performing a wireless connectivity test with the WAP for at least one of the one or more wireless network configurations to generate wireless connectivity test results.

Another embodiment of the present disclosure includes a computer system comprising: one or more computer processors, and a non-transitory computer-readable storage medium comprising instructions that, when executed, control the one or more computer processors to be configured to: receive a wireless access point identifier (WAPID), associated with a particular wireless access point (WAP), from a portable computing device, determine one or more wireless network configurations associated with the WAPID, send the one or more wireless network configurations to the portable computing device, receive a network connectivity test result regarding the WAP from the portable computing device, analyze the network connectivity test result to generate a wireless connectivity summary, and send the wireless connectivity summary to the portable computing device.

The following detailed description and accompanying drawings provide a better understanding of the nature and advantages of particular embodiments.

DETAILED DESCRIPTION

Figure 1A:
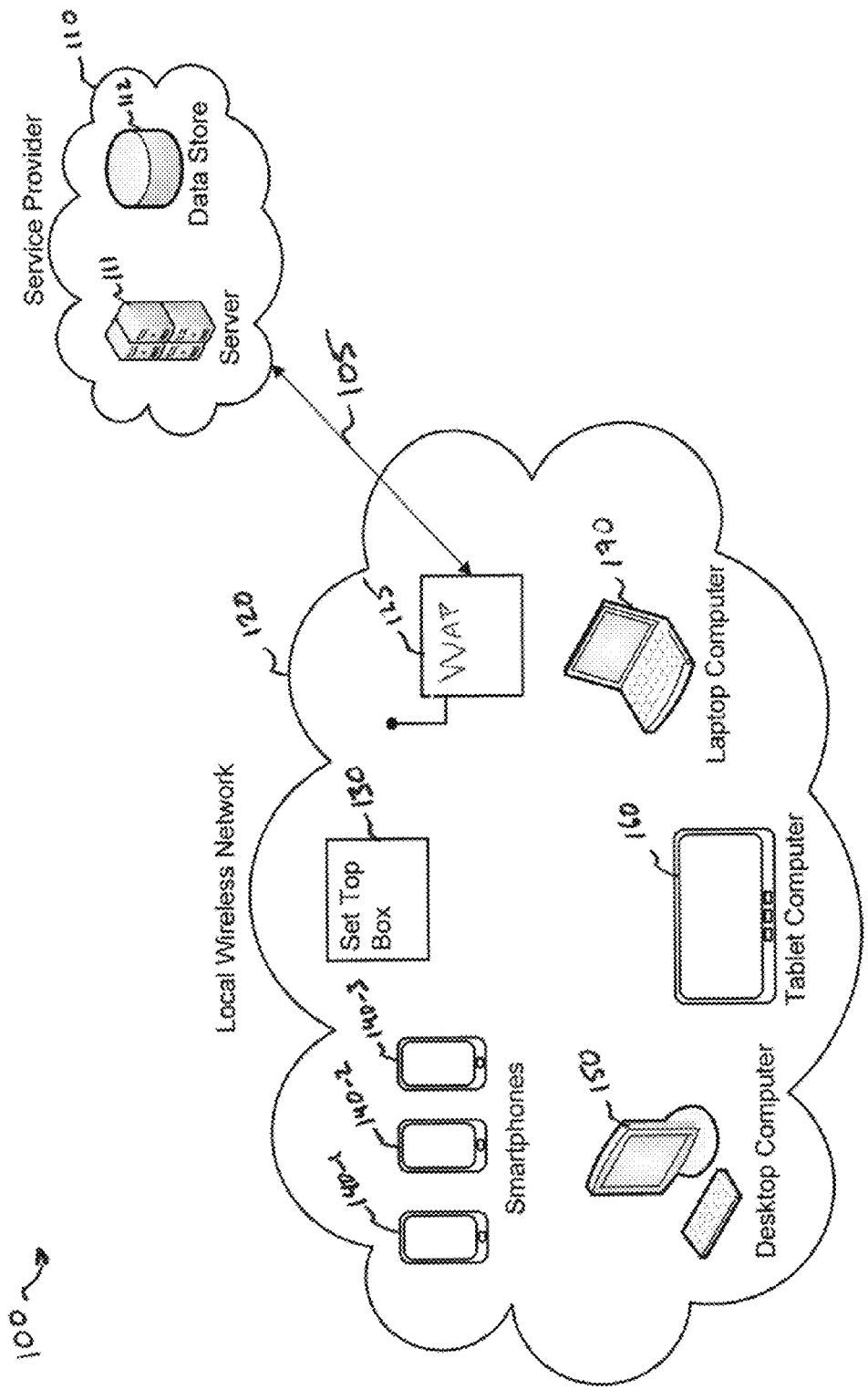
FIG. 1A depicts a schematic diagram of a system for providing high speed data services to a location through a local wireless network established by a WAP, according to an embodiment of the present disclosure.

Described herein are techniques for systems, methods and devices for installing, monitoring and troubleshooting wireless network environments established by wireless access points used to provide high speed data (HSD) services to ensure quality of service (QoS). In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Embodiments of the present disclosure are directed towards systems, methods, and devices for qualifying and monitoring the QoS of wireless networks established by customer premises equipment (CPE), such as cable modems with integrated wireless access points (WAPs). Such embodiments provide mechanisms for supporting WAPs throughout the normal lifecycle of such devices. From facilitating installation, to monitoring and troubleshooting normal operation, embodiments of the present disclosure can advantageously help system operators to increase the QoS to their customers.

Various embodiments of the present disclosure include mechanisms for monitoring the quality of experience (QoE) and/or quality of service (QoS) in wireless network environments used to deliver HSD service, such as high speed Internet access, and the like. For the sake of simplicity, the terms QoE and QoS, as used herein, can be used interchangeably to refer to the actual and/or user perceived efficacy with which HSD service is provided to end-users at the wireless local area network (WiLAN) level. The QoE and QoS can include measurements or perceptions of data throughput speed, WAP signal strength, as well as wireless network reliability, and robustness.

Various embodiments of the present disclosure are implemented as an application executed on a wireless network enabled portable computing device (e.g., a smartphone). The application can be service provider specific and provide users with information specific to HSD services and the WAP provided. Accordingly, while executing the application, the portable computing device can guide a user through the installation process and be in communication with the backend servers and backend processes in case there is need to access information or request commands be sent to the WAP of the wired data connection (e.g., send initialization commands or configuration files to the WAP). In embodiments, the portable computing device can communicate with the backend servers and processes using both licensed (i.e., cellular data services) and unlicensed wireless network connections. This advantageously allows a user access to the backend servers and processes even if the local wireless network connection cannot be established. In addition, once the WAP is installed and the local wireless network is established, the portable computing device can be used test the wireless connectivity with the WAP using the local wireless network. Because of the mobile nature of the portable computing device, the characteristics of the wireless network can be tested at different physical locations. Such capability gives the user the ability to diagnose and correct potential trouble spots in the local wireless network.

FIG. 1A illustrates an example system 100 for providing HSD service 105 (e.g., cable Internet services) by the service provider 110 to end users through a local wireless network 120 established by the WAP 125 (e.g., a cable modem with an integrated wireless router).

As shown, the WAP 125 can establish a local wireless network 120 to facilitate electronic communication among the various wireless network capable devices within range the local wireless network 120 and the service provider 110. In some embodiments, the WAP 125 can provide wireless networking capabilities and HSD services to the home of a particular subscriber. The type of devices in the local wireless network 120 can include different types of devices, such as, set-top boxes (STBs) 130, smart phones 140, desktop computers 150, tablet computers 160, laptop computers 170, and the like. The number of devices allowed to join the local wireless network 120 can be unlimited or limited by settings stored in the WAP 125 to preserve network resources.

When configured and operating correctly, the WAP 125 can establish a stable and secure local wireless network 120 that allows for quickly established and efficient data connections for relatively stationary devices (e.g. set-top box 130 and desktop computer 150) without the need for data wires or cables. The WAP 125 can also provide a level of freedom for users of portable computing devices to access information from any physical location serviced by the local wireless network 120. Any of the devices connected to the local wireless network 120 can communicate with one another wirelessly through the WAP 125 using a wireless network communication protocol (e.g., IEEE 802.11 type protocol). Similarly, the devices in the wireless network 120 may also communicate with the service provider 110 through the WAP 125 and the HSD service 105 (e.g., a wide area network (WAN)). When accessing the service provider 110, devices can access various servers 111 and data stores 112 serviced by or connected to the service provider 110. In a similar fashion, devices on the local wireless network 120 may also communicate with other servers and websites beyond the service provider 110 through the Internet (not shown).

Figure 1B:
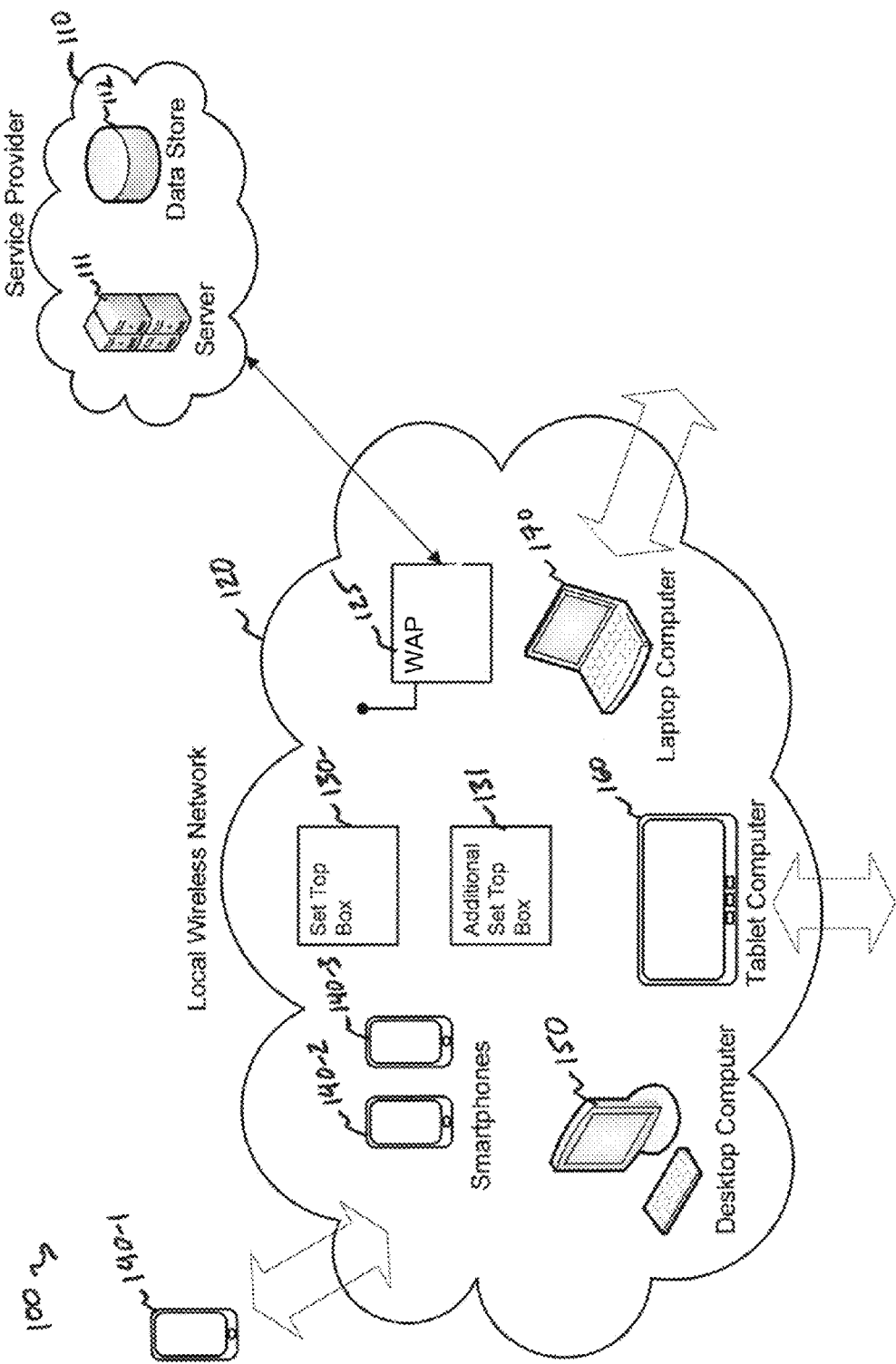
FIG. 1B illustrates changes to a local wireless network established by a WAP when wireless network enabled devices enter and leave the local wireless network.

While the flexibility and mobility provided by the local wireless network 120 affords various advantages to users, the same capabilities can also complicate the wireless network environment. FIG. 1B illustrates how the wireless environment of the system 100 can change as a result of wireless client devices joining and leaving the local wireless network 120. In a practical sense, wireless client devices can join and leave the local network 120 when users take the wireless client devices in and out of the installation site of the WAP 125 (e.g., carries his or her smart phone 140-1, tablet computer 160, or laptop computer 170 in and out of the house). The local wireless network can be further complicated when additional wireless client devices are introduced. For example, when the additional set-top box 131 is added to the local wireless network 120, the topology of the local wireless network 120 might change. For example, as more wireless clients devices are added to the wireless network 120, the network traffic may increase thus reducing network efficiency and potential data throughput as perceived by other devices in the network. In contrast, as wireless client devices leave the local wireless network 120, the available network resources may increase, thus improving the network performance.

The wireless network environment of the local wireless network 120 and WAP 125 can also change as a result of physical alterations made to the installation site. For example users may rearrange furniture and equipment which can create physical interference for the radio signals sent and received by the wireless client devices and the WAP 125. As a result, the physical locations at the installation site that previously received strong signals may receive weaker or no signal at all from the WAP 125. In contrast, physical locations of the installation site that were previously subject to insufficient signal strength from the WAP 125 may experience improved wireless network performance as a result of the physical alterations.

While the conditions of the wireless network environment at the installation site of a particular WAP 125 are important factors in determining QoE, other components in the HSD service chain can also have significant impact on the perception that a particular subscriber may have of the service. For example, service provisioning, service installation, service robustness, customer service, and remote and local troubleshooting can all contribute to increasing or decreasing the QoE for a particular HSD service subscriber.

Figure 2:
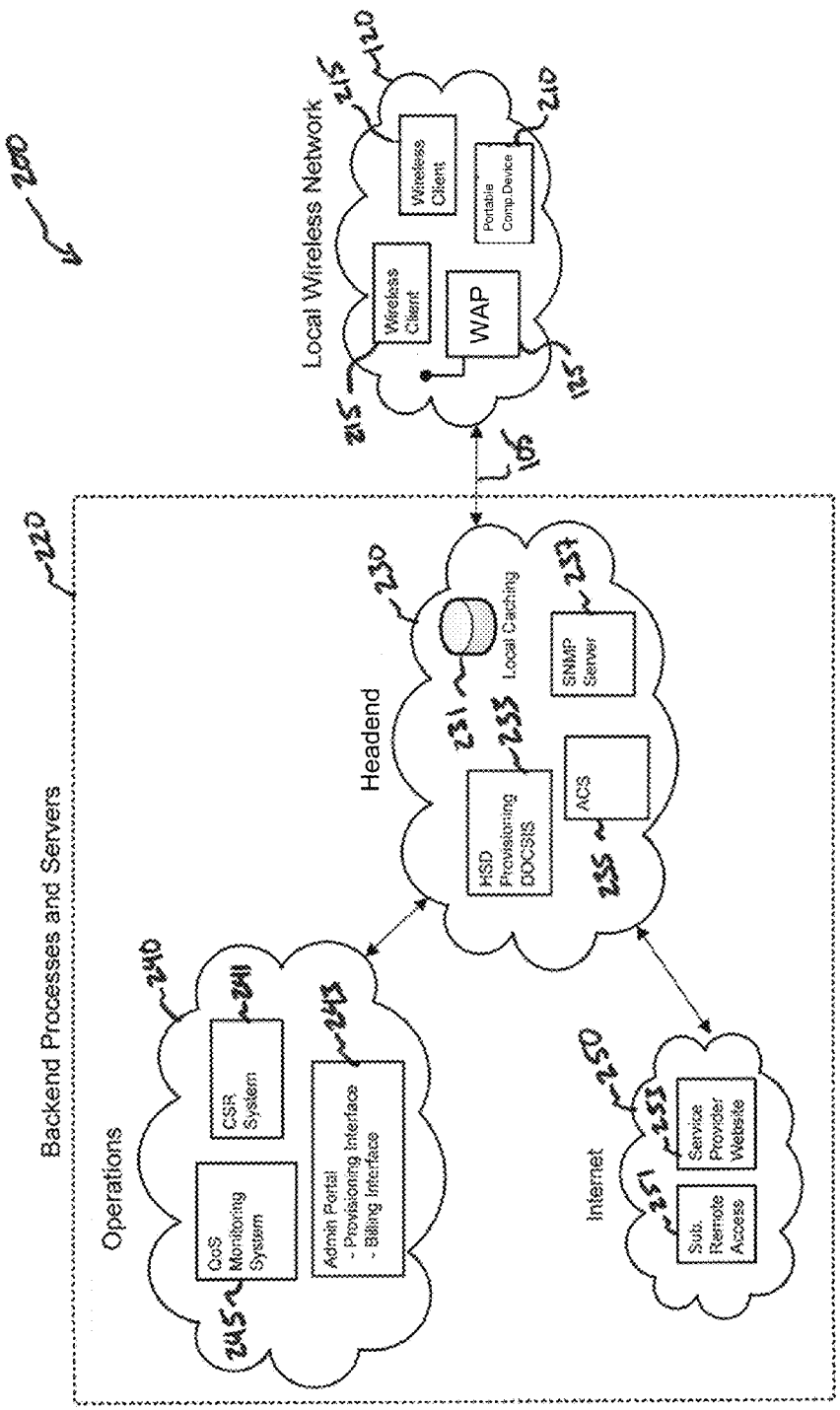
FIG. 2 depicts a schematic diagram of system for provisioning, administering, maintaining, and troubleshooting high speed data (HSD) services, according to an embodiment of the present disclosure.

FIG. 2 depicts a simplified schematic diagram of a system 200 for initiating, provisioning, administering, maintaining, and troubleshooting various aspects of an HSD service provided by backend processes and services 220 to a WAP 125. Each component shown in the backend processes and servers 220 can be grouped according to an underlying function and/or the corresponding potential impact on the QoE of the HSD services to end-users through a local wireless network 120. As shown, the backend processes and servers 220 can be separated into an operations layer 240, an operator's headend layer 230, and an Internet layer 250. In some embodiments, not all of the components in the backend processes and servers will be present to reduce the potential functional redundancies.

In some embodiments, the WAP 125 can monitor conditions observed on the backend processes and servers 220 side and the local wireless network 120 side. The WAP 125 may report the monitoring data to one or more components in the backend processes and servers 220. For example, the WAP 125 can report the monitoring data to the QoS monitoring system 245 in the operations layer 240 for historical trending and troubleshooting. In some embodiments, the operations layer 240 may also include a customer service representative (CSR) system 241. The CSR system 241 may include functionality for providing remote access mechanism to the WAP 125 through the operator's headend 230 and connection 105 so that a customer service representative can access information and conditions in the WAP 125 to detect potential problems and/or troubleshoot those problems before scheduling an on-site service call. In addition, the CSR system 241 can access the monitoring data stored or collected by the QoS monitoring system 245. In addition to the QoS monitoring system 245 and the CSR system 241, the operations layer 240 can include an administration portal 243. The administration portal 243 can include a provisioning interface with functionality for initiating operations in the operator's headend layer 230. For example, the administration portal 243 can provide access to initiating operations in the HSD provisioning data over cable service interface specification (DOCSIS) system 233 for provisioning new data services to a corresponding WAP 125. Additionally, the administration portal 243 can include a billing interface that can communicate directly with the WAP 125 to correctly bill for services, including any premium or extra services, consumed by the WAP 125.

As shown, it may also possible to provide a subscriber remote access system 251, accessible to subscribers through a secure service provider website 253 in the Internet layer 250. The subscriber remote access system 251 can include functionality for providing remote access mechanisms to the WAP 125 through the operator's headend 230 and connection 105 so that subscribers can access information and conditions observed by the WAP 125 to diagnose, troubleshoot, and otherwise fix potential and occurring problems with the local wireless network 120. The service provider website 253 can include remote user authentication over one or more IP protocols.

The operator's headend layer 230 can include administrative functionality. The complex nature of the administrative functionality in the operator's headend layer 230 for configuring a WAP 125 can have significant impact on the QoS delivered to end-users. WAP 125 can potentially have many customizable network configuration settings. Accordingly, in some embodiments, it is advantageous for some, if not all, of the network configuration settings of the WAP 125 to be determined by the HSD provisioning server 233 (e.g., a Data Over Cable Service Interface Specification (DOCSIS) server) to ensure optimum performance and to alleviate the need for an installer or end user to manually configure the WAP 125 during installation. Occasionally, the network configuration settings and the WAP 125 can become corrupted or need updates to correct bugs or suboptimal predetermined settings. In some embodiments, the server 233 can determine new network configuration settings and send them in the form of a configuration file to the WAP 125. In some embodiments, receiving a new configuration file can trigger the WAP 125 to reinitialize or reboot with the settings defined in the configuration file. In other embodiments, the WAP 125 can receive the new configuration file and save it in memory until it is manually rebooted.

In some embodiments, the operator's headend 230 may include a simple network management protocol (SNMP) server 237. The SNMP server 237 can be used to monitor and control the WAP 125 after the initial set up, installation, or a reboot after a new configuration file is sent to the WAP 125. Accordingly, the SNMP server 237 can gather network configurations, network conditions, and other monitoring data from the WAP 125. In other embodiments, the SNMP server 237 can send and receive operations, administration, maintenance, and provisioning (OAM&P) data to and from the WAP 125.

In another embodiment, the operator's headend layer 230 may include an auto configuration server (ACS) 235. The ACS 235 can include functionality at the application layer for remote management of WAP 125. In particular, the ACS 235 can include functionality for automatically configuring the WAP 125 according to the configuration stored in one or more components of the backend processes and servers 220. Due to the wide range of possible manufacturers and types of WAP 125, the ACS 235 can use a universal communication protocol. For example, the ACS 235 can use the communication protocol defined in TR-069. TR-069 is a bidirectional SOAP/HTTP-based protocol that provides communication between CPE, such as WAP 125, and the ACS 235.

The headend layer 230 may also include a local caching system 231 for collecting communication sent to and from the various components of the backend processes and servers 220 and the WAP 125 in case network traffic prevents immediate delivery.

Figure 3:
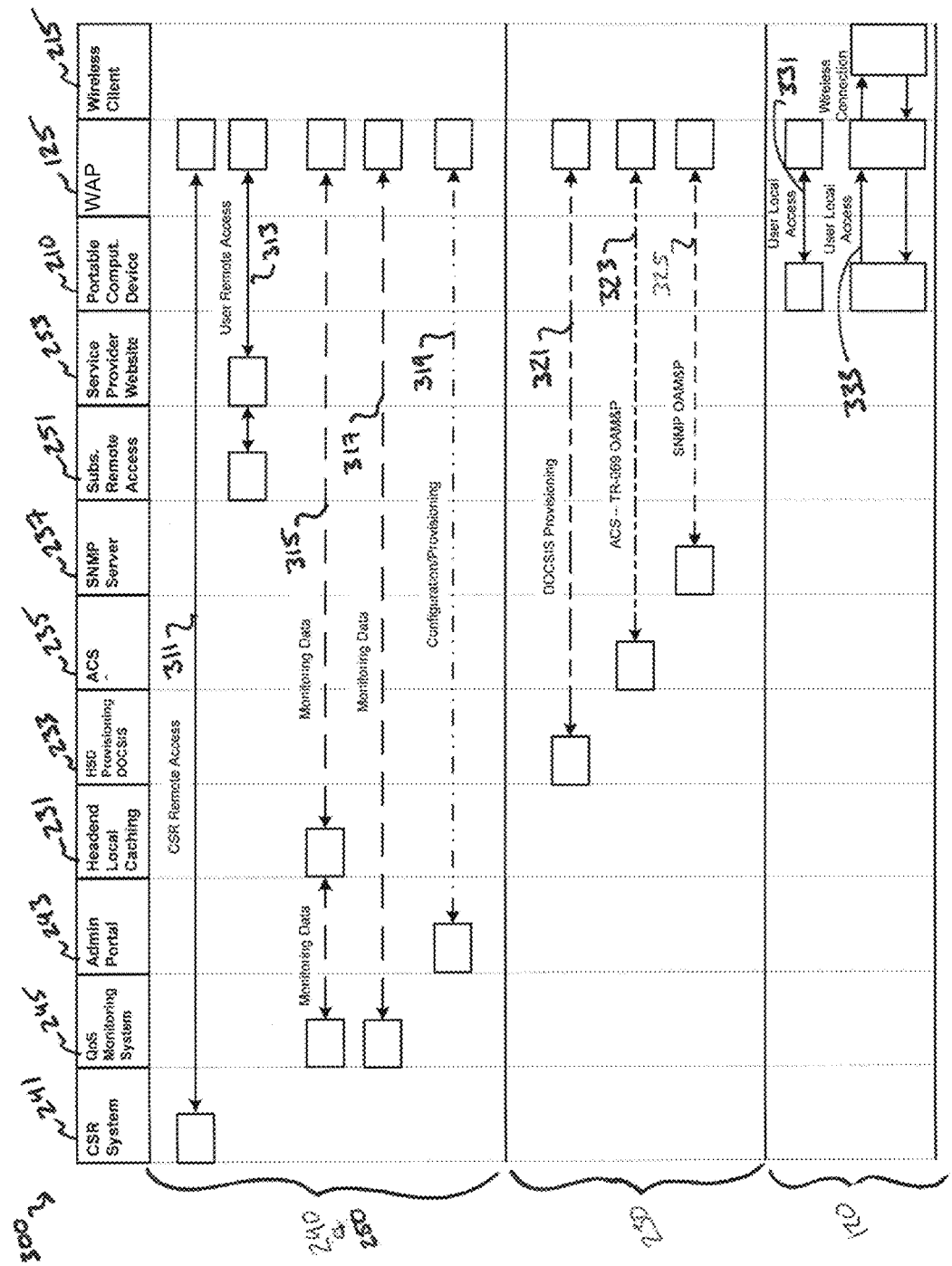
FIG. 3 depicts a chart of data and protocols communicated among the various components of a system for provisioning, administering, maintaining, and troubleshooting high speed data (HSD) services, according to an embodiment of the present disclosure.

FIG. 3 is a connection diagram 300 that explicitly illustrates the connections between the various components illustrated in system 200 of FIG. 2. As shown, each one of the components in the backend processes and servers 220 can communicate with the WAP 125 using corresponding data formats and communication protocols. For example, CSR system 241 can communicate with the WAP 125 using a CSR specific remote access protocol 311. Similarly, the subscriber remote access system 251 can communicate via the service provider website 253 with the WAP 125 using a user remote access protocol 313, which may be similar or identical to the CSR specific remote access protocol 311. The QoS monitoring system 245 can receive monitoring data 315 from the WAP 125 via the headend local caching system 231. In other embodiments, the QoS monitoring system 245 may also receive the monitoring data 317 directly from the WAP 125 by bypassing the headend local caching system 231. The administration portal 243 can send configuration and provisioning data 319 to the WAP 125.

In embodiments, the HSD provisioning server 233 can send provisioning data 321 to the WAP 125 (e.g., DOCSIS configuration files). The ACS 235 can send OAM&P procedures 325 to the WAP 125. As shown, in some embodiments, the OAM&P procedures 323 can be sent using a TR-069 or similar protocol. The SNMP server can communicate with the WAP 125 using OAM&P procedures 325.

Diagram 300 also illustrates how a portable computing device 210 can also communicate directly with the WAP 125. As shown in the local wireless network layer 120, a computing device 210, equipped with a wireless network interface device, can communicate with the WAP 125 using one or more local wireless networking communication access protocols 331 (e.g., IEEE 802.11). In a similar manner, the portable computing device 210 can communicate with one or more wireless client devices 215 using a combination of a local wireless networking communication access protocol 333 and the WAP 125.

As shown in FIG. 3, the WAP 125 can be configured to communicate different types of data with different types of backend processes and servers 220 using various communication protocols. FIG. 3 also shows that the WAP 125 can communicate with a local wireless client device 215 and or a portable computing device 210 using the local wireless network 120. Since the services and servers in the backend processes and servers 220 are typically located in remote locations (e.g., a server farm or head office) relative to the installation site of the WAP 125 (e.g., a subscriber's home), little, if any of the monitoring and troubleshooting data stored in one or more of the backend processes and servers 220 is available to an installer or subscriber while at the installation site. This is particularly true when the installation site is without HSD services 105 prior to installation, there is a fault or malfunction that renders the WAP 125 nonoperational, or if there is an error in the provisioning of the HSD services 105.

Accordingly, embodiments of the present disclosure provide for a portable computing device 210 to be configured to communicate with both with the local WAP 125 and the backend processes and servers 220 while at the installation site of the WAP 125. Such embodiments provide the ability to guide a user or service technician in the proper procedures for installation and troubleshooting of a WAP 125. In addition, through the use of both licensed and unlicensed network communication devices, such embodiments can also provide on-demand communication with the WAP 125 and the backend processes and servers 220 to confirm proper and/or optimal configuration of the WAP 125.

Since many portable computing devices, such as smart phones 140 and tablet computers 160, have powerful processors and are equipped with both licensed wireless data (i.e., cellular data) interface devices and unlicensed wireless communication interface devices (e.g., Bluetooth, IEEE 802.11, etc.), various embodiments of the present disclosure are implemented in computer executable code executed on the processor of a portable computing device 210. Such computer executable code delivered to, stored on, and executed on a portable computing device is commonly referred to herein as an application or "an app" 210.

FIG. 4A illustrates an example portable computing device 210 in the context of a local wireless network 120 established by a WAP 125 in communication with backend processes and servers 220. As shown, the portable computing device 210 can include a number of components. For example, the portable computing device 210 can include a processor 411, a memory 413, a user interface component 415, an integrated testing component 410, a wireless local area network interface component 417, and a cellular data interface component 419, all of which can communicate with one another over a data bus 412.

In one embodiment, the integrated testing component 410 can be implemented as an application stored in the memory 413 and executed on processor 411. Accordingly, the integrated testing component 410 can be an instance of the application executing on the processor 411.

In one embodiment, the integrated testing component 410 can include functionality for generating and rendering a user interface on the user interface component of 415. For example, the integrated testing component 410 can generate and render a graphical user interface on a display device of the user interface component 415, such as a touchscreen display.

The graphical user interface can include a number of controls for interacting with the integrated testing component 410. Using the controls, integrated testing component 410 can receive user input (e.g., buttons, text fields, sliders, etc.). In response to the user input received through the user interface component 415, the integrated testing component 410 can invoke various subcomponents.

In one embodiment, the integrated testing component 410 can include an installation test component 420, a location test component 430, a device test component 440, and a troubleshooting component 450. Each one of the subcomponents can include routines and functionality for controlling other components of the portable computing device 410. For example, any one of the subcomponents of the integrated testing component 410 can send and receive information using the wireless LAN interface 417 or the cellular data interface 419. In addition, one or more of the subcomponents of the integrated testing component 410 can control a camera or other imaging device (not shown). The general functionality of each one of the subcomponents is described below in reference to FIGS. 5A through 5D.

As described herein, the local wireless network 120 in a particular installation site can be established by a WAP 125. In addition to the portable computing device 210, the local wireless network may include one or more wireless client devices 215. As used herein, the term "wireless client device" is used generically to refer to any electronic device with wireless network communication capability for sending and receiving network communication signals to one another, the backend processes and servers 220, and other computer system on the Internet through the WAP 125 and the HSD service connection 105. As described herein, wireless client devices 215 can include smart phones 140, desktop computers 150, tablet computers 160, STBs 130, laptop computers 170, media servers, and the like.

In some embodiments, the WAP 125 may include a corresponding testing component 123 in communication with one or more configuration files 127. They testing component 123 can be implemented as computer executable code executed on a processor or microcontroller in the WAP 125. The testing component 123 may be specifically implemented to interact with the integrated testing component 410. For example, the testing component 123 can use the same message types as the integrated testing component 410. Accordingly, integrated testing component 410 can gather status, configuration, and monitoring information from the WAP 125 by communicating with the testing component 123.

Figure 4:
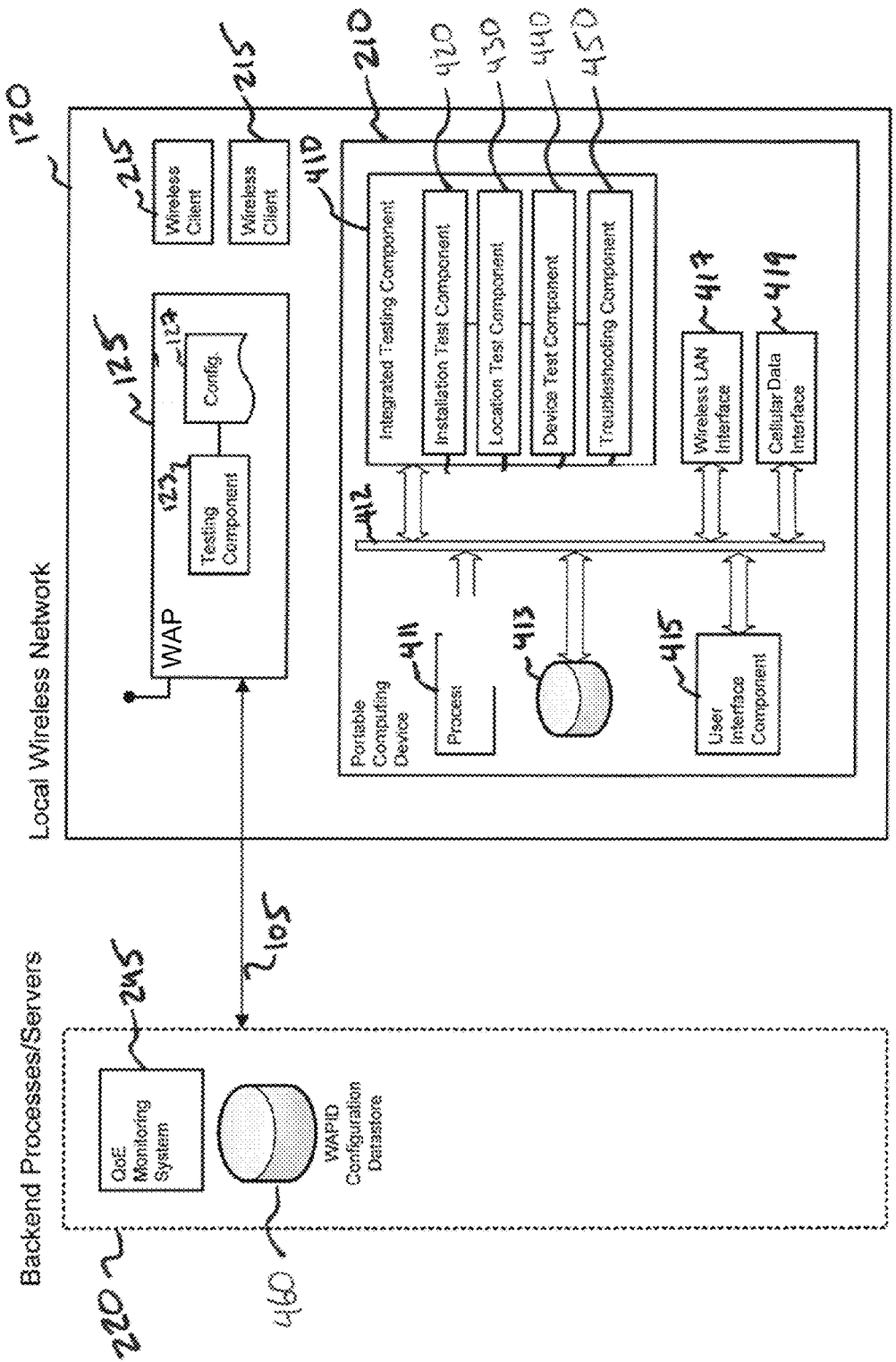
FIG. 4 depicts a schematic of a portable computer device that can be used to test the connectivity of a WAP, according to an embodiment of the present disclosure.

While many of the backend processes and servers 220 are not specifically shown in FIG. 4A, embodiments of the present disclosure to include implementations in which the WAP 125 can communicate with one or more of the previously mentioned backend processes and servers 220 over the HSD connection 105. In addition to the previously mentioned backend processes and servers 220, FIG. 4 also depicts a WAPID configuration data store 460 for storing predetermined provisioning and network configuration settings associated with specific WAPIDs. The functionality and utility of the WAPID configuration data store 460 will be discussed in more detail below.

Installation Test

When a new or replacement WAP 125 is delivered to an installation site, it is up to an installer technician or the end-user subscriber to setup and ensure that the WAP 125 is working correctly. To assist in installation, the installation test component 420 can be invoked on the portable computing device 210. For example, the portable computing device 210 can receive user input to execute an application implementation of the integrated testing component 410. Once the integrated testing component 410 is invoked and running on the portable computing device 210, it can receive user input to begin installation test component 420. In some embodiments, installation test component 420 is implemented as a subroutine of the integrated testing component 410.

Figure 5A:
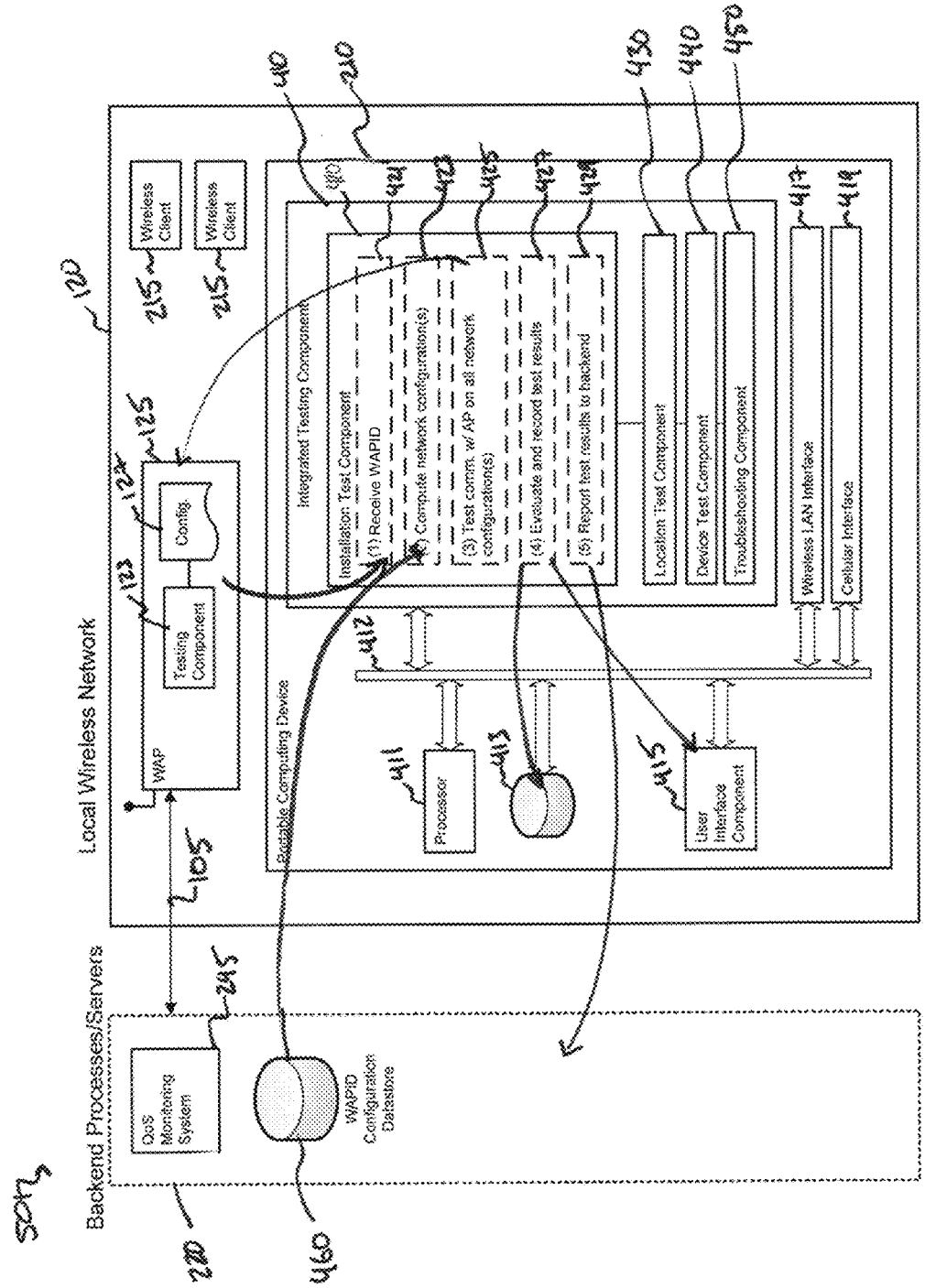
FIG. 5A depicts a flow for testing the connectivity of a WAP during installation using a portable computing device, according to an embodiment of the present disclosure.

FIG. 5A depicts a flow 501 that can be performed by the installation test component 420 to assist a user in the installation of WAP 125 at an installation site. At step (1) (reference 421), the installation test component 420 can receive an identifier associated with the WAP 125, referred to herein as a "WAPID". In one embodiment, the WAPID can be the MAC address assigned to the WAP 125 by the manufacturer. In other embodiments, the WAPID can be another unique identifier associated with the particular WAP 125 being installed.

In one embodiment, receiving the WAPID can include receiving user input manually entered into a graphical user interface corresponding to the installation test component 420 (e.g., the WAPID entered into a text field). In another embodiment, receiving the WAPID may include activating a camera or other imager (not shown) of the portable computing device 210 to image and recognize a machine readable code that includes the WAP. For example, the installation test component 420 can control the imaging device in the portable computing device 210 to image a barcode, QR code, machine-readable numerals, and the like, printed on the body of the WAP 125. In other embodiments, the installation test component 420 can activate a near field detection device (not shown) of the portable computing device 210 to detect and read a near field identification device in the WAP 125 (e.g., an RFID tag) to read information that includes the WAPID. In yet another embodiment, the installation test component 420 can start a monitoring mode in which it scans all of available networks and all available frequency bands received over the wireless LAN interface component 417. Once in a monitoring mode, the installation test component 420 can prompt the user to restart the WAP 125 to force it to reinitialize. On the restart, the WAP 125 will initialize itself and start broadcasting its unique WAPID. The installation test component 420 can then detect the most recently broadcast WAPID as the WAPID for the WAP 125.

At step (2) (reference 423), the installation test component 420 can compute one or more network configurations for the WAP 125. In one embodiment, to compute the one or more network configurations of the WAP 125, the installation test component 420 can analyze the WAPID, and generate a corresponding set of network configurations. As used herein, the term "network configuration" can refer to any information needed by the portable computing device 210, or other wireless client device 215 for that matter, to communicate with the WAP 125 once it is powered on and initialized according to network configuration settings stored in the configuration file 127.

In one embodiment, generating network configurations can include referencing a WAPID configuration data store 460 in the backend processes and servers 220. The WAPID configuration data store 460 can be populated with predetermined network configurations assigned to a WAP 125 by its WAPID.

The network configuration can include a specific set of network identifiers (e.g., SSID), frequency bands, encryption codes, passwords, and the like. In one embodiment, a network configuration can include an SSID and a specific frequency band. Since WAP 125 can be configured to support multiple SSIDs that can be in turn serviced by multiple frequency bands, a particular WAP 125 can be associated with several network configurations. For example, WAP 125 can include two distinct SSIDs both of which are serviced by two separate frequency bands (e.g. 2.5 GHz and 5 GHz).

At step (3) (reference 425), the installation test component 420 can initiate a wireless connectivity test. The wireless connectivity tests can include attempting to establish communication with the WAP 125 using some or all of the network configurations. For example, the installation test component 420 can test the quality of the signal exchange between the portable computing device 210 and WAP 125 on each SSID and each frequency band. Accordingly, the installation test component 420 can initiate a test signal to be sent through the wireless LAN interface 417 to the WAP 125. If the WAP 125 receives and can processes the test signal, the testing component 123 may generate information to be sent back to the portable computing device 210 as a response signal. The portable computing device 210 may then, depending on the condition of the local wireless network, receive the response signal. If the portable computing device 210 does not receive a response signal after sending a test signal using a particular network configuration, then the installation test component 420 can interpret the nonresponse as a failure to establish communication with the WAP 125 using that particular network configuration.

Each response signal received from the WAP 125, and/or the analysis thereof, are referred to herein as wireless connectivity test results. Wireless connectivity test results can include a received signal strength identification (RSSI), signal latency, indications of frequency band interference, and indications of frequency band network congestion, signal-to-noise ratios, data throughput information, network priority information, indications of fatal errors, and the like.

In step (4) (reference 427), installation test component 420 can evaluate the wireless connectivity test results to characterize wireless connectivity between the portable computing device 210 and the WAP 125. In one embodiment, once the wireless connectivity test results are evaluated, they can be stored locally in the memory 413 and/or displayed in a graphical user interface rendered on the user interface component 415. In one embodiment, evaluating the wireless connectivity test results can include generating a summary that summarizes the wireless connectivity test results. In some embodiments, the summary can include a numerical, alphabetical, or icon summary grade. For example, the summary of the wireless connectivity test results can be a simple graphical representation, such as a large stylized "OK" to indicate that portable computing device 210 was able to establish communication with the WAP 125 all available network configurations indicating that the WAP configuration is functional and working properly. Alternatively, the summary of the wireless connectivity test results can include an indication that the WAP configuration failed. For example, the summary may include indication that the WAP 125 could not be reached, that the WAP 125 was configured differently than expected, or that there was interference with one or more of the SSIDs or frequency bands that were tested.

At step (4) (reference 429), the installation test component 420 can report the wireless connectivity test results and/or the summary back to the one or more components in the backend processes and servers 220 for logging purposes and confirmation that the WAP 125 was delivered installed correctly. This information can then be used to properly bill the subscriber and provide historical information that can be used in future troubleshooting sessions. In one embodiment, reporting information back to the backend processes and servers 220 can include sending signals using the wireless LAN interface 417 or the cellular data interface 119.

Location Test

Figure 5B:
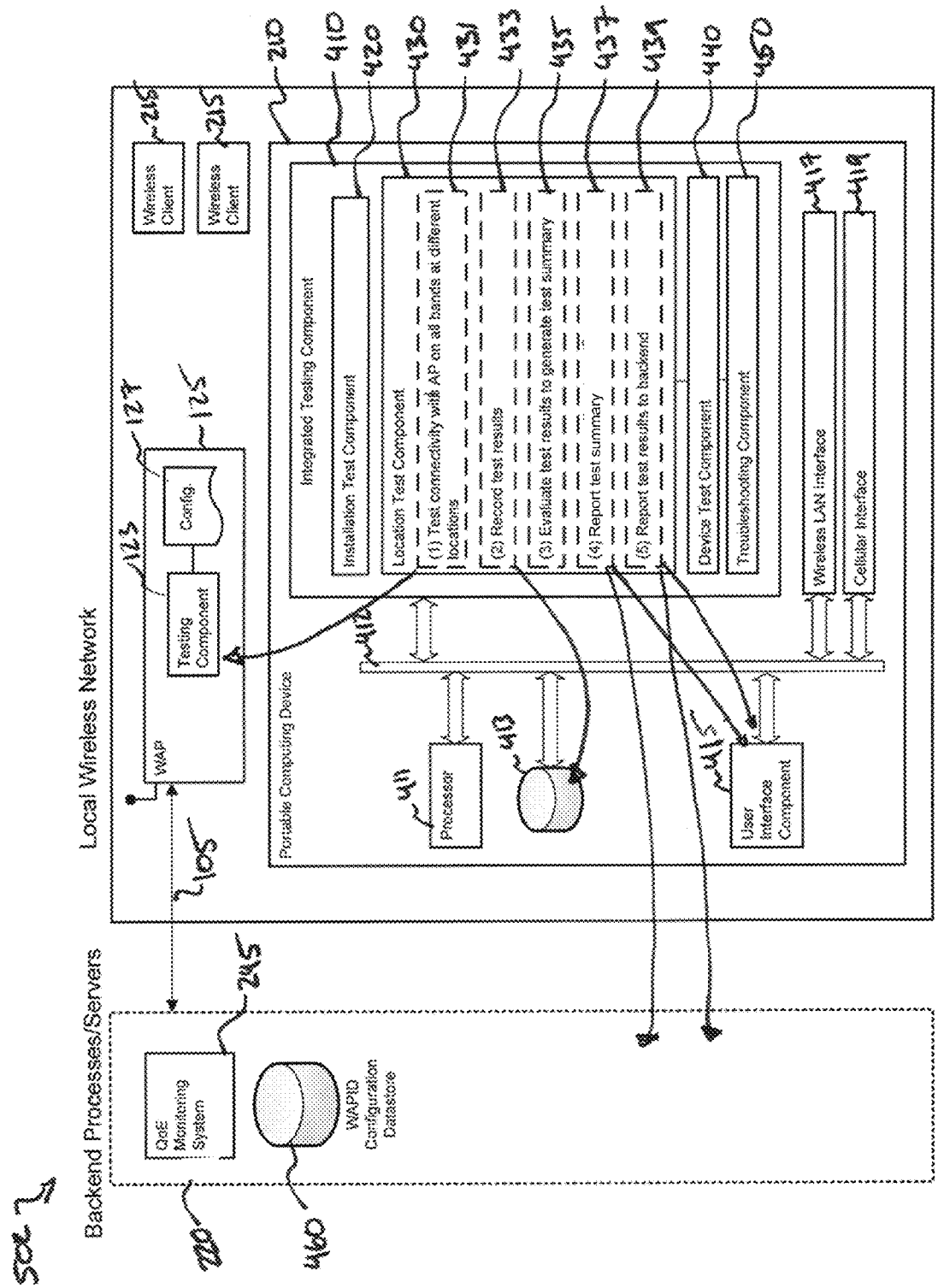
FIG. 5B depicts a flow for testing the connectivity of a WAP in different physical locations of the installation site using a portable computing device, according to an embodiment of the present disclosure.

FIG. 5B depicts a flow 502 can be performed by the location test component 430 to test the signal strength and quality of the wireless network 120 established by WAP 125 in different physical locations of the installation site. In the embodiment shown in FIG. 5B, the location test component 430 can obtain the WAPID and associated network configurations from the installation test component 420. Alternatively, if the WAPID is not available from the installation test component 420, the location test component 430 can perform the steps (1) and (2) (reference numerals 421 and 423) described in reference to FIG. 5A to obtain the WAPID and determine the applicable network configurations.

Once the applicable network configurations for the WAP 125 have been obtained or otherwise determined, at step (1) (reference 431) the location test components can test the wireless connectivity between the portable computing device 210 and the WAP 125 from one or more physical locations at the installation site. As discussed in reference to the installation test component 420, testing the wireless connectivity can include sending a test signal from the portable computing device 210, and receiving in response to the test signal, a response signal from the WAP 125. Again, the quality and content of the response signal can be analyzed to generate one or more wireless connectivity test results.

At step (2) (reference 433), the location test component 430 can record the test results in the memory 413.

At step (3) (reference 435), the location test component can evaluate the wireless connectivity test results to generate a summary for each one of the multiple locations tested. In one embodiment, the summary can include a comparison of the signal strength, data throughput, and other wireless network characteristics detected in response signals received by the portable computing device 210 while in the various physical locations. In such embodiments, the comparison can include a descriptive identifier of the location (e.g., living room, downstairs family room, upstairs office, etc.) to give a user a better idea where the highest quality wireless network connection can be found at the installation site At steps (4) and (5) (references 437 and 439) the location test component 430 can report the wireless connectivity test results and summary back to one or more components in the backend processes and servers 220. This information can be used as a data point at a particular time against which future changes to the wireless network environment 120 can be compared for troubleshooting purposes. In one embodiment, reporting the wireless connectivity test results and summary can include generating a graphical user interface on the user interface component 415 and displaying the network connectivity test results. Such information can be used by a user to rearrange the wireless network environment if they would like to improve the network connectivity characteristics of the network. For example, the location of the WAP 125 can be changed, or one or more of the wireless client devices 215, pieces of furniture, or other equipment, within the wireless network environment can be relocated in an attempt to improve the signal strength of the wireless network in a particular location. Once changes to the wireless network environment are made, the location test component 430 can be rerun to reevaluate location-based wireless network connectivity characteristics.

Wireless Client Device Test

Figure 5C:
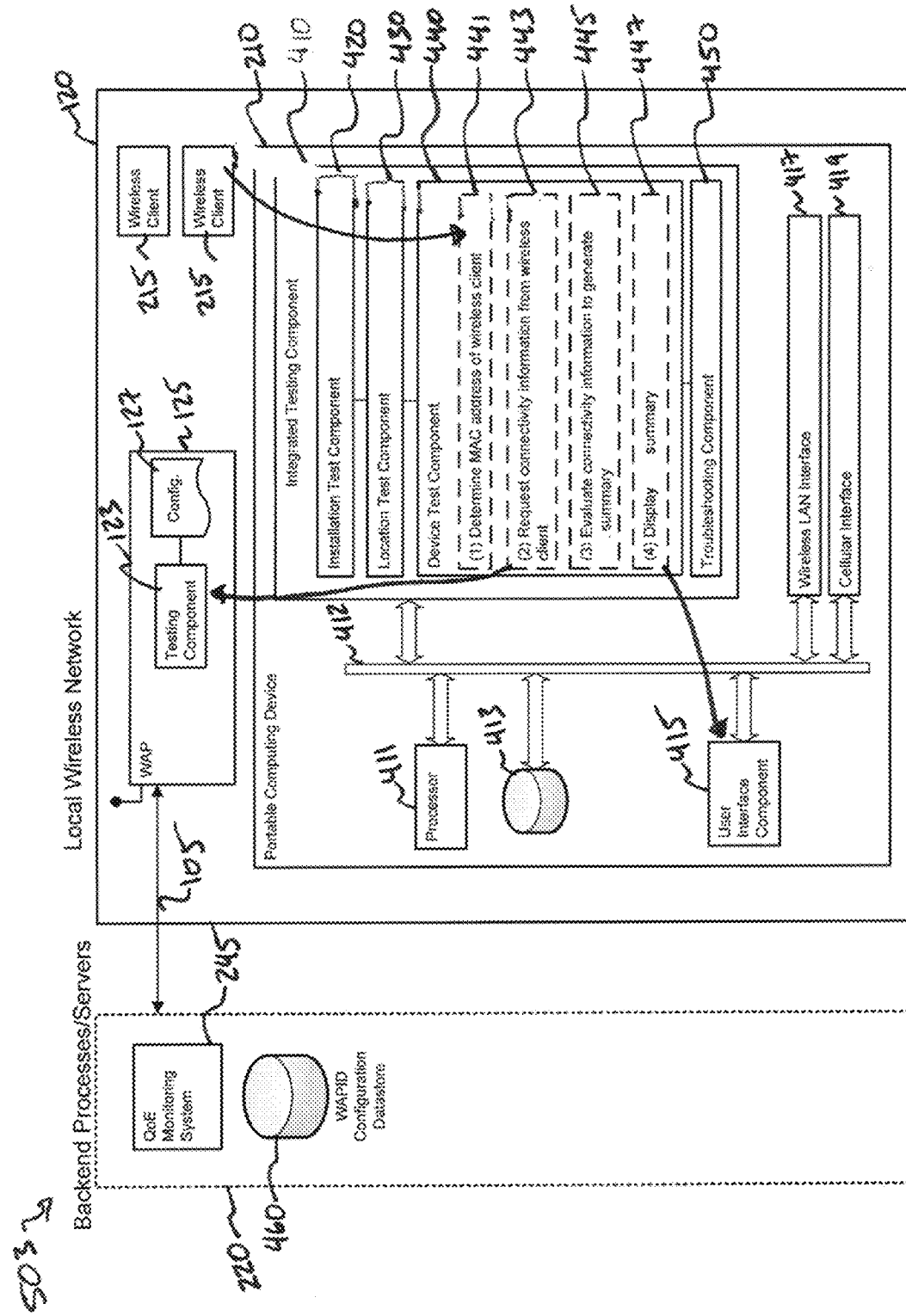
FIG. 5C depicts a flow for testing the connectivity of other wireless client devices with a WAP using a portable computing device, according to an embodiment of the present disclosure.

FIG. 5C depicts a flow 503 that can be performed by the device test component 440 to determine the wireless connectivity characteristics of one or more wireless client devices 215 through the WAP 125. Because many wireless client devices 215 include the capability to report network connectivity information observed by that wireless client device 215, it is advantageous to use the portable computing device 210 to obtain information from as many of the components as possible to get the best possible analysis of the QoS of the local wireless network 120 established by the WAP 125.

At step (1) (reference 441) device test component 440 can determine an identifier, such as the MAC address, of a particular wireless client device 215. Similar to determining the WAPID of the WAP 125, the device test component 440 can receive the MAC address from manually entered user input, a barcode, the QR code, machine-readable numerals, or a near field identification device.

At step (2) (reference 443) the device test component 440 can send a request to the WAP 125 for wireless connectivity information from the wireless client device 215 associated the obtained MAC address. In response to the request, testing component 123 resident in the WAP 125 can query the corresponding wireless client device 215 for any and all available wireless connectivity information. If the wireless client device 215 has any wireless connectivity information, it can send its back to the device tests component 440 through the testing component 123 in the WAP 125.

At step (3) (reference 445), the device test component 440 can evaluate the connectivity information received from the wireless client device 215 to generate a summary of the connectivity information. In some embodiments, the wireless client device 215 can include historical wireless network connectivity information that can be used to evaluate the changes in the local wireless network 120 and/or to identify past or periodic errors in the WAP 125.

Finally, at step (4) (reference 447), the device test component 440 can display the summary in a graphical user interface rendered in the user interface component 415. In one embodiment, the wireless network connectivity information received from the wireless client device 215 and/or the summary of the connectivity information can be reported back to the backend processes and servers and/or stored in the memory 413.

Troubleshooting

Figure 5D:
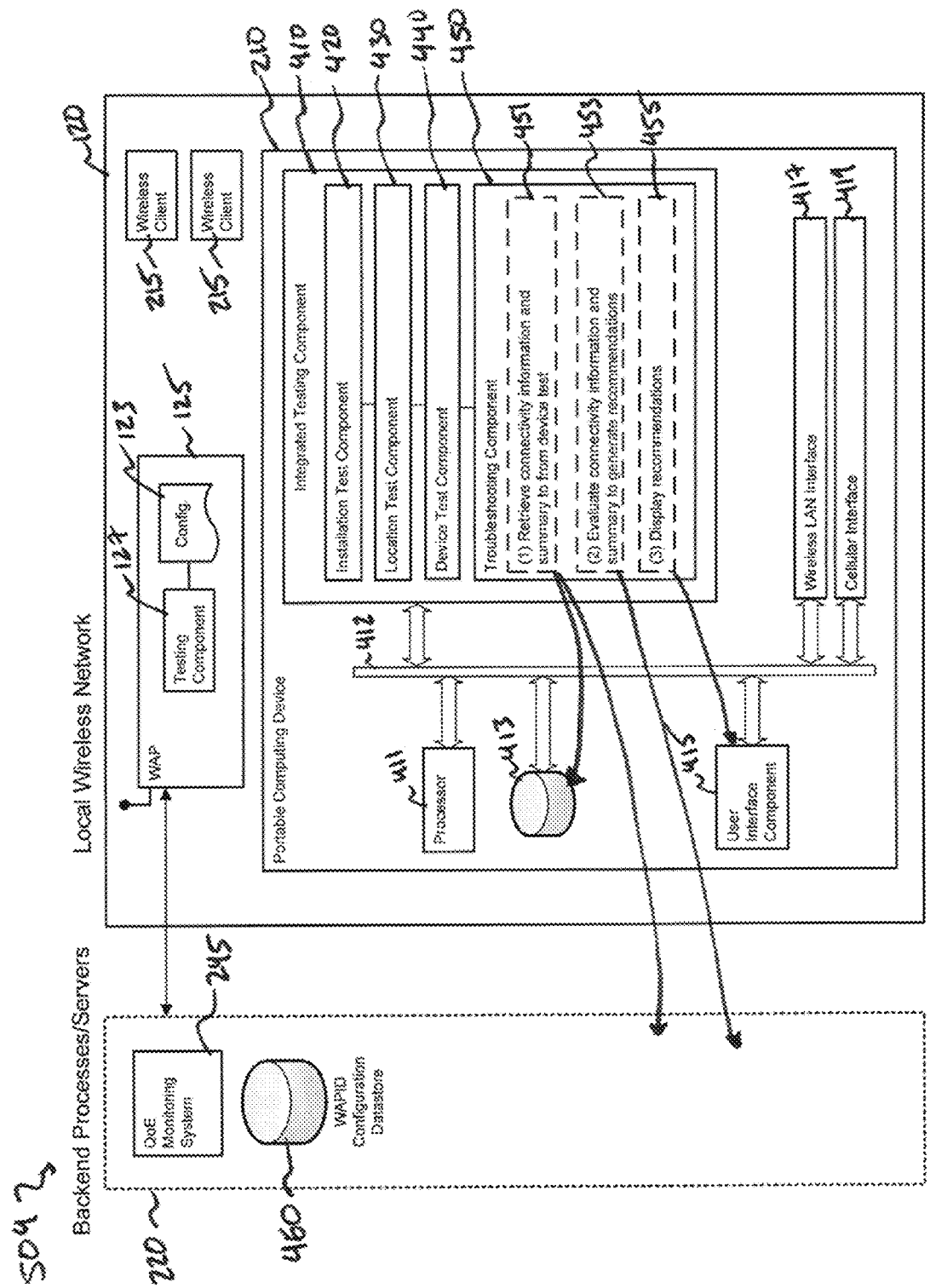
FIG. 5D depicts a flow for troubleshooting the connectivity of a WAP using a portable computing device, according to an embodiment of the present disclosure.

FIG. 5D depicts a flow 504 can be performed by the troubleshooting component 450 to troubleshoot wireless network connectivity issues in a wireless client device 215 or the WAP 125. At step (1) (reference 451), troubleshooting component 450 can retrieve connectivity information and/or a summary of the connectivity information for any or all of wireless client device 215 and/or the WAP 125. The wireless connectivity information and/or summary can be retrieved from the previously stored records in the memory 413 or one or more components in the backend processes/servers 220.

At step (2) (reference 453), the troubleshooting component 450 can evaluate the connectivity information and/or the summary of the connectivity information to generate one or more recommendations to identify and/or resolve any existing connectivity issues. In one embodiment, the evaluation of the connectivity information can include referencing one or more components, such as the QoE monitoring system 245, to retrieve a predetermined listing of recommended actions that can potentially resolve the connectivity issues associated with the connectivity information. Similarly, the evaluation of the summary of the connectivity information can include retrieving a predetermined listing of recommended actions that can potentially resolve the connectivity issues indicated by the summary of the connectivity information. For example, if the summary indicates that the connection between the WAP 125 and wireless client device 215 is good, then the recommended course of action can be that no action is necessary. In contrast, however, if the summary indicates that the connectivity between the WAP 125 in the corresponding wireless client device 215 is only marginal, then the predetermined recommended course of action may include that the physical location of the WAP 125 or the wireless client device 215 should be changed.

Finally, at step (3) (reference 455), troubleshooting component 450 can display the recommendations to remedy the existing connectivity issues in a graphical user interface rendered in the user interface component 415.

It should be appreciated that flows 501, 502, 503, and 504 of FIGS. 5A, 5B, 5C, and 5D are illustrative and many variations, modifications, and alternatives are possible. For example, in some embodiments, flow 504 can be modified to evaluate the connectivity information in summary form to generate recommendations by referencing a listing of predetermined recommendations stored in the memory 413 instead of referencing one or more components of the backend processes/servers 220. In such embodiments, the troubleshooting component 450 can provide troubleshooting recommendations even in the absence of a connection with processes/servers 220.

Figure 6A:
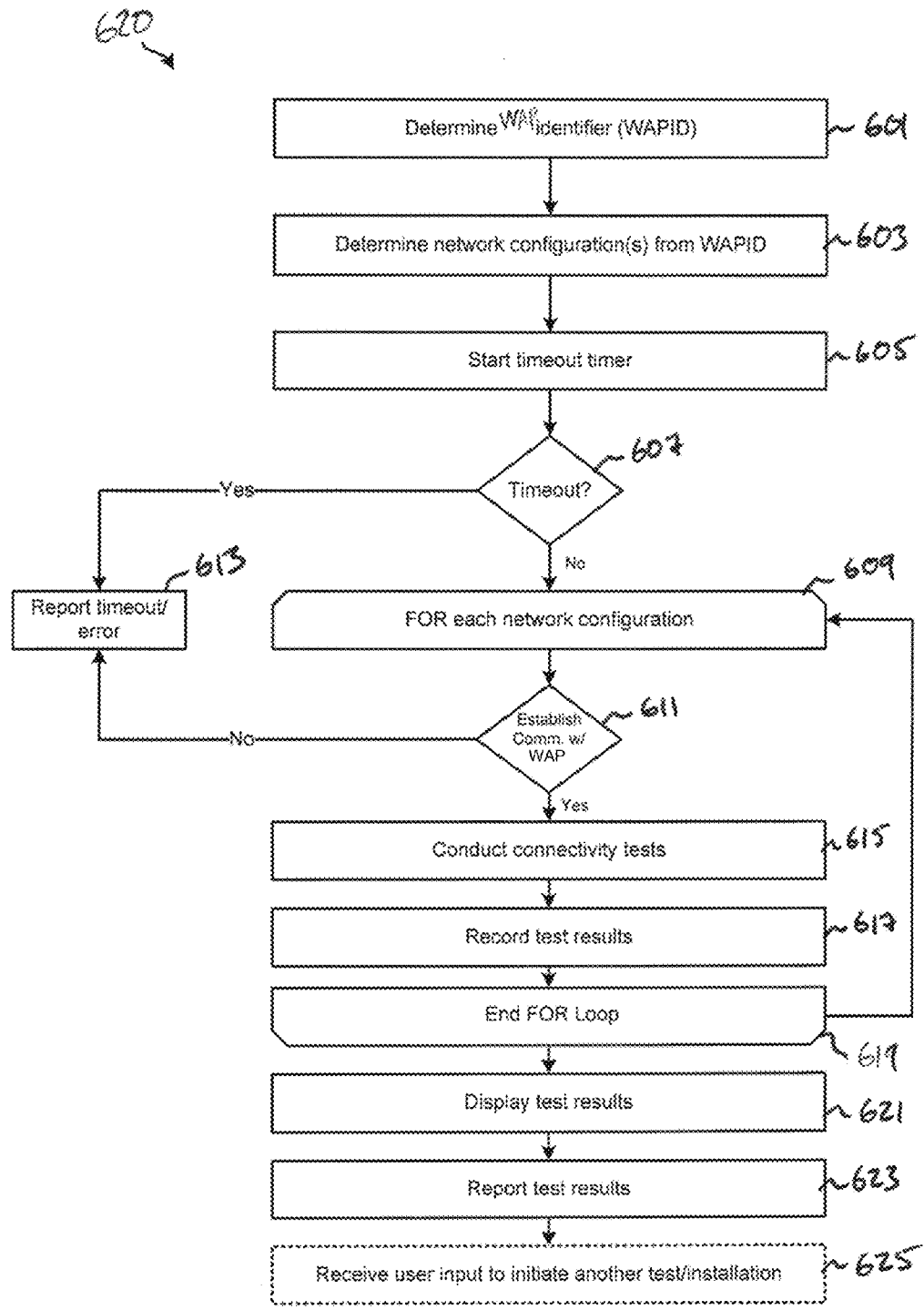
FIG. 6A depicts a flowchart that provides additional details regarding the installation testing flow of FIG. 5A, according to an embodiment of the present disclosure.

FIG. 6A depicts a flowchart 620 that can be performed by the installation tests component 420 of the integrated testing component 410 for testing the installation and configuration of a WAP 125 according to one embodiment of the present disclosure. Flowchart 620 provides a more detailed description of the steps attributed to the installation tests component 420 in flow 501 of FIG. 5A.

In block 601, the installation test component 420 can determine a WAPID associated with the particular WAP 125. As described in reference to FIG. 5A, the installation test component 420 can receive the WAPID as manually entered user input or by scanning a computer readable WAPID from a barcode, QR code, or RFID disposed on the WAP 125. In one embodiment, the installation test component 420 can control one or more components of the portable computing device 210 to receive the WAPID in one of the manners described above.

At block 603, the installation test component 420 can determine one or more network configurations for the WAP 125 based on the corresponding WAPID. In one embodiment, the installation test component 420 can calculate the network configurations from information encoded in the WAPID. For example, the installation test component 420 may be able to identify the WAP 125 as being part of a series of WAPs manufactured for a particular operator known to configure its WAPs with a particular set of network configurations (e.g., three SSIDs with two serviced by two frequency band while the other one is only serviced by a single frequency band, all using the common encryption scheme). In another embodiment, determining the network configuration based on the WAPID can include referencing one or more previously saved network configuration file associated with the WAPID stored in one of the components in the backend processes and servers 220 or memory 413.

At block 605, the installation test component 420 can start a timeout timer to avoid running down the battery of the portable computing device 210 in case the user gets distracted by other tasks.

At determination 607, if the timeout timer has expired, then the installation test component 420 can report the timeout at block 613. However, if the timeout timer has not expired, then the installation test component 420 enters a loop for each network configuration of the WAP 125 to be tested (block 609). Within the loop, the installation test component 420 can conduct one or more wireless connectivity tests with the WAP 125. The wireless connectivity tests can include attempting to establish communication with the WAP 125 by sending a test signal from the portable computing device 210 to the WAP 125, and in response, receiving a response signal. As part of the test, installation test component 420 can determine whether or not a response signal was received. If no response signal was received, then the wireless connectivity test may determine at determination 611 that communication cannot be established with the WAP 125 using those particular network configuration settings. If no communication to be established, then the installation test component 420 can report an error for that particular set of network configuration settings (block 613).

If, however, the installation test component 420 can establish communication with the WAP 125, it can conduct one or more wireless connectivity tests (block 615). The wireless connectivity tests can include exchanging one or more wireless communication signals between the portable computing device 210 and the WAP 125. Any signals received by the portable computing device 210 from the WAP 125 can be analyzed to determine one or more wireless connectivity test results. Analysis of the signals received from the WAP 125 can include examination of the signal strength, signal quality, latency, signal content, network traffic, interference, and the like.

At block 617, the installation test component 420 can record the connectivity test results for the current set of network configuration settings. At block 619, the installation test component 420 can reach the end of the current loop iteration and return to block 609 to test the WAP 125 with the remaining network configuration settings associated with the WAPID.

At block 621, the installation test component 420 can display the test results for all of the network configuration settings associated with the WAPID. In some embodiments, displaying the test results can include generating a summary or simplified version of the test results. For example, for each set of network configuration settings, a user interface device can display a summary grade such as "good", "marginal", "no connection", or "configuration issue". Alternatively, the various network configuration settings that were tested can be evaluated on a pass-fail basis, such that the simplified test results may include an icon indicating whether the portable computing device 210 was successful in establishing communication with the WAP 125 using those settings (e.g., a checkmark indicating success, and an X mark indicating failure).

In related embodiments, when the test results or the summary test results are displayed on the user interface component 415, they can be rendered as interactive controls. For example, an icon representing the failure to establish communication with the WAP 125 with a particular set of configuration settings can be rendered with an underlying integrated dynamic control that, when selected, invoke suggestions for remedying corresponding the error/failure.

At block 623, the installation test component 420 can report the test results and/or the test results summary to one or more components in the backend processes/servers 220.

In one embodiment, at block 625, the integrated testing component 410 can return to the home screen after completing the routines associated with the installation test component 420 to wait to receive user input to initiate another subcomponent (e.g., initiation of a new test). While block 625 is optional, embodiments of the present disclosure advantageously leverage the ability of the subcomponents of the integrated testing component 410 to share information such as the WAPID for a particular WAP 125, MAC addresses for available wireless client devices 215, and the like.

Figure 6B:
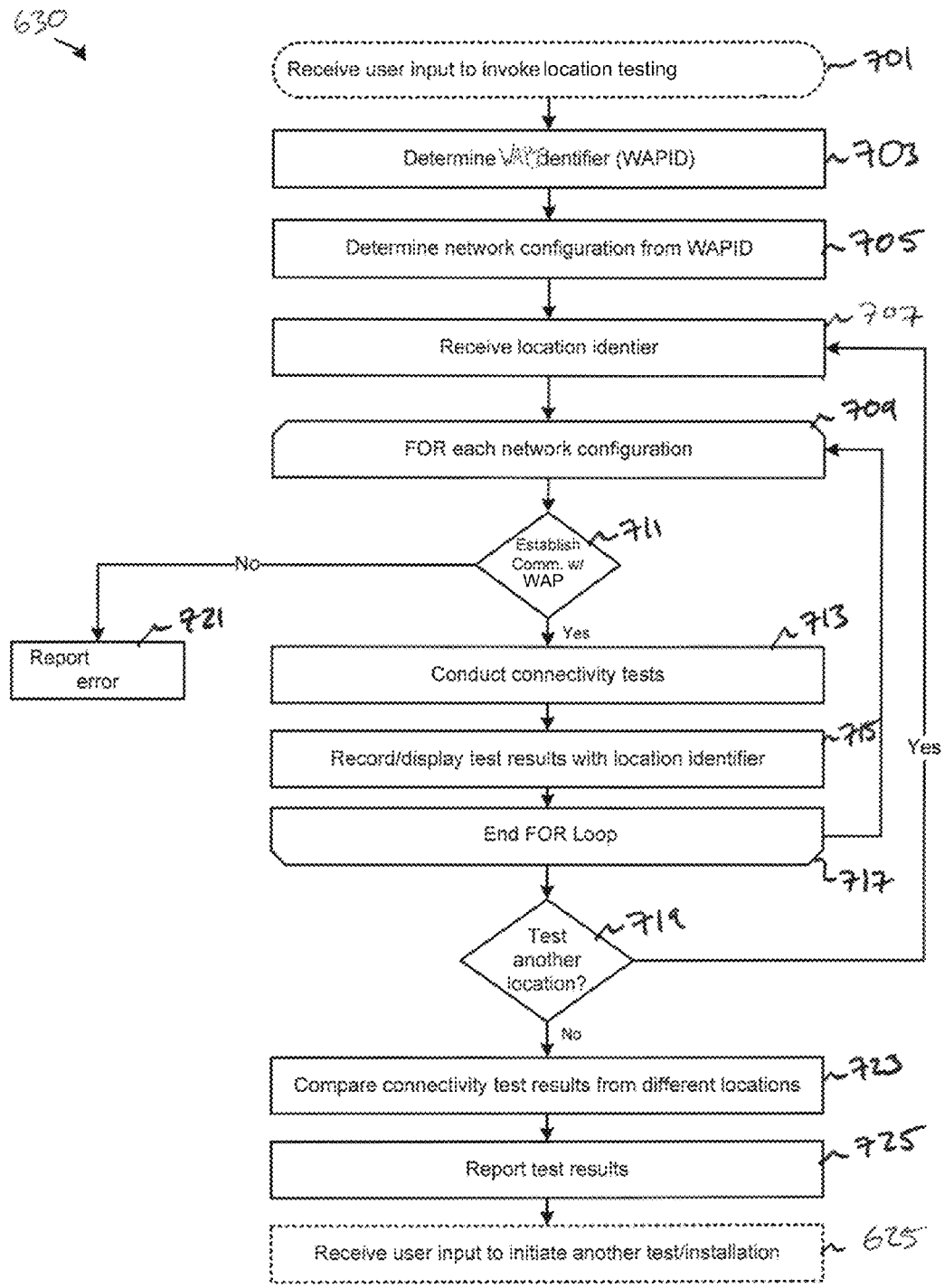
FIG. 6B depicts a flowchart that provides additional details regarding the location testing flow of FIG. 5B, according to an embodiment of the present disclosure.

FIG. 6B depicts a flowchart 630 that can be performed by the location test component 430 of the integrated testing component 410 to test the quality of the wireless signal in a local wireless network 120 established by the corresponding WAP 125 at various physical locations. Flowchart 630 provides a more detailed description of the steps attributed to location test component 430 in flow 502 of FIG. 5B. Some of the steps of flowchart 630 may also be performed by the integrated testing component 410.

At optional block 701, the location test component 430 may receive user input to invoke the location testing. For example, as indicated by block 625 in flowcharts 620, 630, 640, and 650 in FIGS. 6A, 6B, 6C, and 6D, whenever one of the subcomponents of the integrated test component 410 is completed, the user may be given the option to invoke the same or a different test. Accordingly, in the example shown in FIG. 6B, in response to receiving user input to invoke the location testing in block 701, the location test component 430 may determine a WAPID for a particular WAP 125 (block 703). As discussed above, the location test component 430 may receive the WAPID from a previously executed sub component of the integrated testing component 410. Alternatively, the WAPID may be received from manually entered user inputs or by scanning machine readable code from the WAP 125.

At block 705, the location test component 430 can determine one or more network configuration settings based on the WAPID, as described above in reference to flowchart 620 of FIG. 6A.

Once the WAPID in the corresponding network configuration settings are determined, the location test component 430 can prompt the user to enter a location identifier, at block 707. The location identifier can be associated with a particular physical location at the installation site associated with the corresponding WAP 125 and or the local wireless network 120. In one embodiment, the location identifier can be descriptive (e.g., living room, kitchen table, upstairs bedroom, etc.). In other embodiments, the location identifier can be a coordinate within a particular area (e.g., GPS coordinates or other grid coordinates superimposed over the area served by the local wireless network 120).

Once the location test component 430 receives a location identifier, it can enter a loop to test the wireless connectivity between the portable computing device 210 and the WAP 125 using some or all of the network configuration settings associated with the WAPID.

The first step in the loop is to attempt to establish communication with the WAP using the current network configuration settings (determination 711). If communication cannot be established between the portable computing device 210 and the WAP 125, then the location test component 430 can report an error at block 721. However, if communication can be established between the WAP 125 and the portable computing device 120, then at block 713, the location test component 430 can conduct one or more connectivity tests with the WAP 125. The resulting measurements from the connectivity tests can then be recorded and/or displayed alongside with the corresponding location identifier.

At block 717, the location test component 430 can reach the end of the current loop and return to block 709 to test and record the connectivity with the remaining network configuration settings. When all of the available network configuration settings have been tested, the location test component 430 can determine whether the user wants to test another location at the installation site of WAP 125. In one embodiment, the location test component 430 can prompt the user to enter a new location identifier or to and the location connectivity testing process.

If at determination 719, the location test component 430 determines that the user wishes to test connectivity at different location, the process can begin again at block 707. If at determination 719, the location test component 430 receives user input indicating no more locations are to be tested with the current network configuration settings, then at block 723, the wireless connectivity test results from the different locations can be compared to one another. The comparisons can be reported at block 725. Reporting the connectivity test results in the form of comparison between the different locations can include being displayed on the user interface component 415 or stored in one or more components in the backend the server/processes 220.

Again, at optional block 625, the integrated testing component 410 can generate a user interface to wait for user input to indicate the initiation of another test or installation of another WAP 125.

Figure 6C:
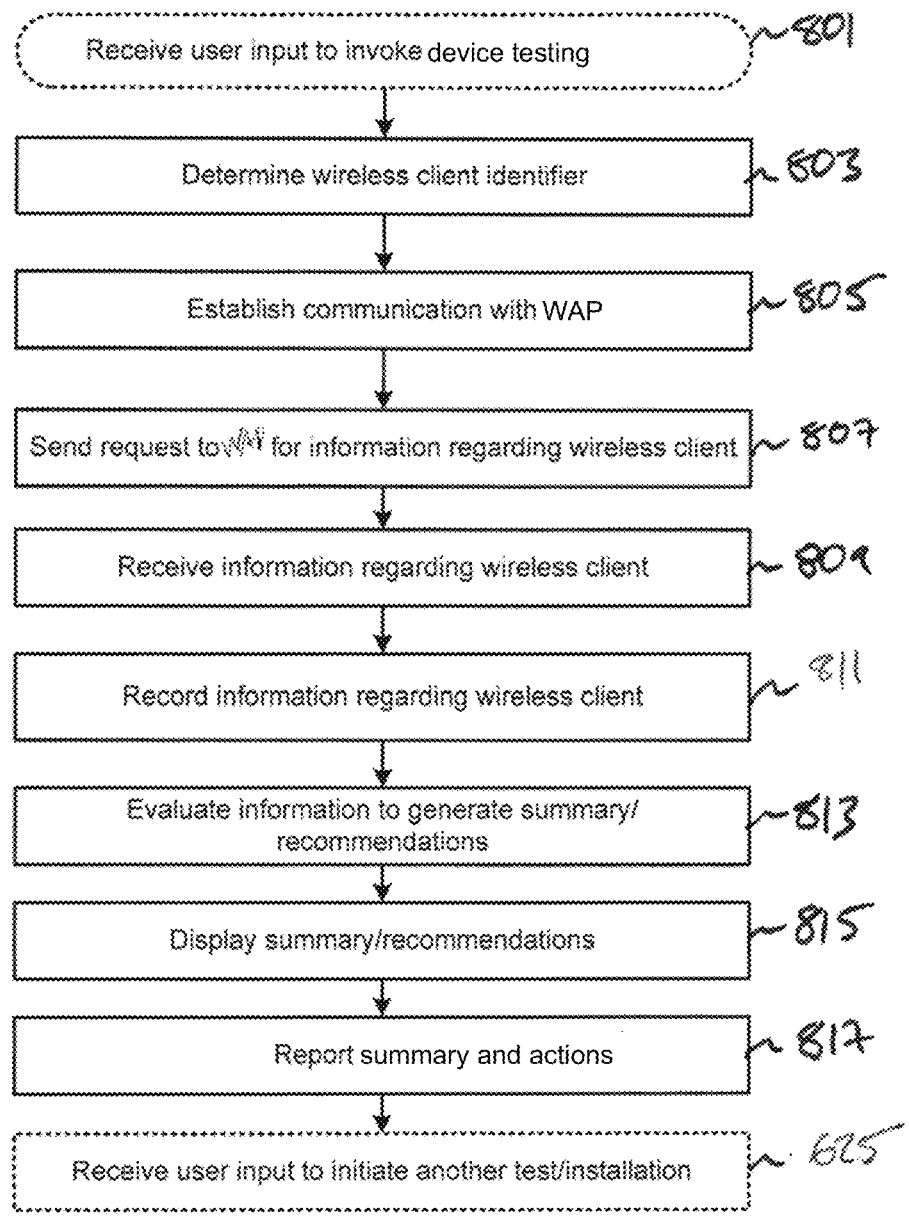
FIG. 6C depicts a flowchart that provides additional details regarding the wireless client device testing flow of FIG. 5C, according to an embodiment of the present disclosure.

FIG. 6C depicts a flowchart 640 that can be performed by the device test component 440 of the integrated testing component 410 according to embodiments of the present disclosure. Flowchart 640 provides a description of the steps attributed to the device component 440 in flow 503 of FIG. 5C.

At block 801, the integrated testing component 410 can receive user input to invoke the device test component 440 through a graphical user interface rendered on the user interface component 415. At block 803, device test component 440 can determine the wireless client device identifier. In one embodiment, the wireless client device identifier can include the MAC address or another unique identifier associated with the particular wireless client device 215.

At block 805, the device test component 440 can establish communication with the WAP 125 to which the wireless client device 215 is in communication. At block 807, the device test component 440 can send a request to the WAP 125 for information regarding the wireless client device. In one embodiment, the request can include the wireless client device identifier.

In response to the request, the device test component 440 can receive information regarding the wireless client device, at block 809. Such information can include wireless network connectivity information observed by the wireless client device 215. The wireless network connectivity information can include both current and historical data.

At block 811, the device test component 440 can record or store the information either locally in the memory 413 or by sending it to one or more components in the backend processes/servers 220. Any one of the backend processes/servers 220 can use the information from the particular wireless client device 215 to evaluate the QoE to a particular local wireless network 120 established by the corresponding WAP 125.

At block 813, the device test component 440 can evaluate the information received from the wireless client device 215 to generate a summary of the local wireless network environment. In one embodiment, the information received from the wireless client device 215 can also be evaluated to generate recommendations on how to improve the QoS experience by that particular wireless client device 215 and any other devices within the local wireless network 120. Recommendations can be determined or generated based on information stored by one or more components in the backend processes/servers, such as QoE monitoring system 245. For example, the listing of previously observed errors and connectivity issues can be associated with solutions with proven track records for correcting those errors and issues.

A block 815, the device test component 440 can display the summary and recommendations to user in a graphical user interface rendered on user interface component 415.

A block 817, the device test component 440 can report the summary and any remedial actions to one or more of the components in the backend processes and servers 220. The summary and information about the remedial actions taken to remedy any detected connectivity errors or issues can be used by various processes to inform future recommendations for remedying similar connectivity errors or issues. Accordingly, the feedback loop continually improves the basis for recommending potentially helpful solutions for correction observe network connectivity issues.

At block 625, the integrated testing component 410 or the device testing component 450 can wait to receive user input to initiate another test or WAP installation.

Figure 6D:
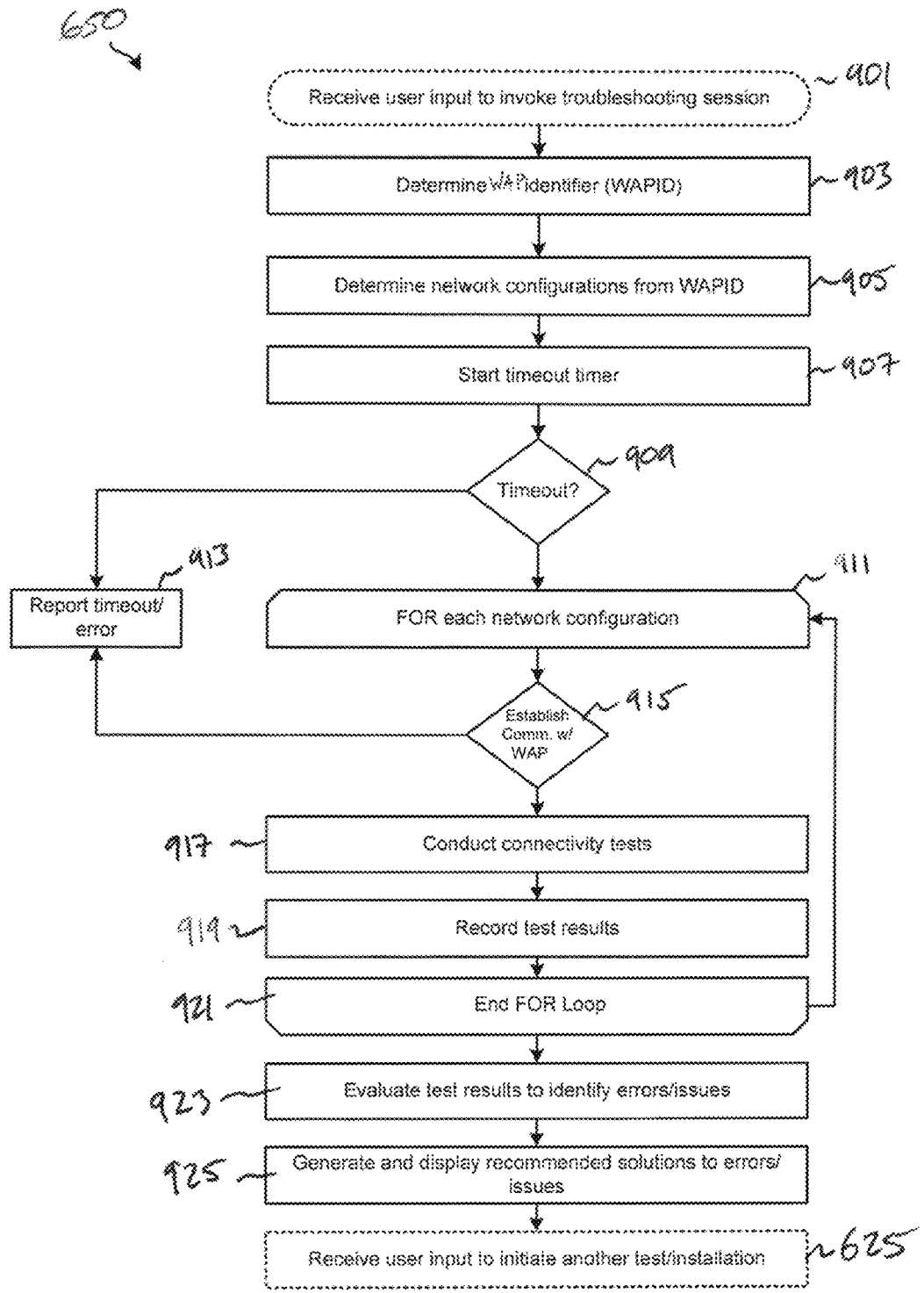
FIG. 6D depicts a flowchart that provides additional details regarding the troubleshooting flow of FIG. 5D, according to an embodiment of the present disclosure.

FIG. 6D depicts a flowchart 650 that can be performed by the integrated testing component 410 or the troubleshooting component 450 of the portable computing device 210 for troubleshooting connectivity errors or issues in a local wireless network 120 established by a WAP 125. Flowchart 650 provides a description of the steps attributed to the troubleshooting component 450 in the flow 504 of FIG. 5D.

At optional block 901, the integrated testing component 410 can receive user input to invoke a troubleshooting session. Invoking the troubleshooting session can include invoking the troubleshooting component 450.

Blocks 903 through 921 are similar to blocks 601 through 619 of FIG. 6A. The additional blocks 923 and 925 in flowchart 650 relate to generating recommendations for correcting detected connectivity errors. Specifically, at block 923, the troubleshooting components 450 can evaluate connectivity test results to identify any particular errors or issues in connectivity between the portable computing device 210 and WAP 125. For example, one or more of the test results might indicate that a measure of the signal strength (e.g., RSSI) received from the WAP 125 is too weak to be reliable. The test results may also indicate the measure of the signal strength is too weak because the signal-to-noise ratio of a particular set of network configuration settings is so low that a neighboring electromagnetic signal source (e.g., a WAP at a neighboring facility operating at the same frequency band) is introducing too much interference.

At block 925, the troubleshooting component 450 may generate and display recommended solutions to correct the errors and issues in the connectivity. Generating the recommended solutions can include sending a request for troubleshooting recommendations that includes the identified connectivity issues to one or more of the backend processes/servers 220. In response to the request for recommendations, the troubleshooting component 450 may receive one or more recommended solutions based on an analysis of the identified connectivity issue or similar connectivity issues. In the particular example discussed above, one recommendation may be to change or skip the frequency band in which too much interference is being observed.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
receiving, by a portable computing device, a wireless access point identifier (WAPID) associated with a wireless access point (WAP);
determining, by the portable computing device, one or more wireless network configurations associated with the WAP in response to the receiving of the WAPID;
performing, by the portable computing device, a wireless connectivity test with the WAP using at least one of the one or more wireless network configurations to test wireless connectivity with the WAP configured using the at least one of the one or more wireless network configurations;
generating, by the portable computing device, a wireless connectivity test result based on the performing of the wireless connectivity test; and
evaluating, by the portable computing device, the wireless connectivity test result to generate a wireless connectivity summary that summarizes the wireless connectivity test;
wherein performing the wireless connectivity test comprises:
receiving, in the portable computing device, a wireless client identifier associated with a wireless client device;
sending a request message, comprising the wireless client identifier, to the WAP to request wireless connectivity information for the wireless client device;
receiving, in response to the request message, the wireless connectivity information from the WAP that retrieved the wireless connectivity information for the wireless client; and
evaluating the wireless connectivity information to generate the wireless connectivity test result.

2. The method of claim 1, wherein the wireless connectivity summary comprises a summary grade based on at least a portion of the wireless connectivity test result.

3. The method of claim 1, wherein the wireless connectivity summary comprises recommendations for improving the wireless connectivity test result.

4. The method of claim 1, wherein determining the one or more wireless network configurations associated with the WAP comprises:
sending the WAPID to a remote computer system; and
receiving, in response to the WAPID, the one or more wireless network configurations.

5. The method of claim 1, wherein performing the wireless connectivity test comprises:
sending a test request signal to the WAP;
receiving, in response to the test request signal, a test response signal from the WAP; and
analyzing the test response signal to generate the wireless connectivity test result.

6. The method of claim 1, wherein the wireless connectivity test result comprises a measurement of signal strength received from the WAP.

7. The method of claim 1, wherein the wireless connectivity test result comprises a measurement of data throughput speed through the WAP.

8. The method of claim 1, further comprising sending, in response to generating the wireless connectivity test result, a request from the portable computing device to a remote computer system to send an initialization command to the WAP through a wired connection.

9. The method of claim 1, wherein receiving the WAND comprises imaging, by the portable computing device, a code from the WAP.

10. The method of claim 1, wherein receiving the WAND comprises:
monitoring, by the portable computing device, a plurality of wireless network frequency bands; and
detecting, by the portable computing device, a recently broadcast WAPID as the WAPID.

11. The method of claim 1, wherein the one or more network configurations comprises a plurality of service set identifiers (SSIDs) and a plurality of radio frequency bands.

12. The method of claim 1, further comprising sending the wireless connectivity test result from the portable computing device to a remote computer system executing a quality of service monitoring application.

13. A method comprising:
receiving, by a portable computing device, a wireless access point identifier (WAPID) associated with a wireless access point (WAP);
determining, by the portable computing device, one or more wireless network configurations associated with the WAP in response to the receiving of the WAPID;
performing, by the portable computing device, a wireless connectivity test with the WAP using at least one of the one or more wireless network configurations to test wireless connectivity with the WAP configured using the at least one of the one or more wireless network configurations;
generating, by the portable computing device, a wireless connectivity test result based on the performing of the wireless connectivity test; and
evaluating, by the portable computing device, the wireless connectivity test result to generate a wireless connectivity summary that summarizes the wireless connectivity test;
wherein performing the wireless connectivity test comprises:
receiving a first location identifier;
for a first physical location associated with the first location identifier, performing the wireless connectivity test to generate a first wireless connectivity test result;
receiving a second location identifier;
for a second physical location associated with the second location identifier, performing the wireless connectivity test to generate a second wireless connectivity test result; and
comparing the first wireless connectivity test result to the second wireless connectivity test result to generate the wireless connectivity test result.

14. A non-transitory computer-readable storage medium containing instructions that, when executed, control a computer system to be configured for:
receiving a wireless access point identifier (WAPID), associated with a particular wireless access point (WAP), from a portable computing device;
determining one or more wireless network configurations associated with the WAPID;
sending the one or more wireless network configurations to the portable computing device;
receiving a network connectivity test result regarding the WAP from the portable computing device;
analyzing the network connectivity test result to generate a wireless connectivity summary;
sending the wireless connectivity summary to the portable computing device; and
sending an initialization command comprising the one or more wireless network configurations to initiate an initialization routine in the WAP.

15. The non-transitory computer-readable storage medium of claim 14, wherein the instructions that control the computer system to determine the one or more wireless network configurations further comprise instructions to control the computer system to be configured to retrieve the one or more wireless network configurations from a wireless access point configuration data store based on the WAPID.

16. The non-transitory computer-readable storage medium of claim 14, wherein the wireless connectivity summary comprises recommendations for improving the wireless connectivity results.

17. A portable computing device configured to be communicatively coupled to a computer system, the portable computing device comprising:
 one or more computer processors; and
 a non-transitory computer-readable storage medium comprising instructions that, when executed, control the one or more computer processors to be configured to:
  send, from the portable computing device to the computer system, a wireless access point identifier (WAPID) associated with a wireless access point (WAP);
  receive, from the computer system, one or more wireless network configurations associated with the WAP in response to the WAPID;
  perform, responsively to the one or more wireless network configurations received by the portable computing device, a wireless connectivity test with the WAP for at least one of the one or more wireless network configurations to generate wireless connectivity test results;
  send, from the portable computing device to the computer system, a wireless connectivity test result regarding the WAP;
  receive, from the computer system, a wireless connectivity summary based on an analysis performed by the computer system of the network connectivity test result; and
  send an initialization command comprising the one or more wireless network configurations to initiate an initialization routine in the WAP.

\* \* \* \* \*